United States Patent [19]

Camm

[11] Patent Number: 4,645,270
[45] Date of Patent: Feb. 24, 1987

[54] VEHICLE BRAKE SYSTEM AND VALVE

[75] Inventor: John J. Camm, East Malvern, Australia

[73] Assignee: Repco Limited, Melbourne, Australia

[21] Appl. No.: 699,052

[22] Filed: Feb. 6, 1985

[30] Foreign Application Priority Data

Feb. 9, 1984 [AU] Australia ............... PG3553

[51] Int. Cl.⁴ ............... B60T 13/00; B60T 13/62
[52] U.S. Cl. ............................. 303/7; 303/25
[58] Field of Search ............ 303/2, 7, 8, 25, 40, 303/6 M; 188/3 M, 170; 280/421, 428

[56] References Cited

U.S. PATENT DOCUMENTS 3,158,409 11/1964 Hughson et al. ............. 303/25 X
3,456,991 7/1969 Valentine et al. ............. 303/40 X
4,049,324 9/1977 Cermak ........................... 303/7
4,131,324 12/1978 Kurichh .......................... 303/7
4,478,459 10/1984 Cumming ........................ 303/7

FOREIGN PATENT DOCUMENTS 47-16004 4/1972 Japan ............................. 303/40

Primary Examiner—Joseph J. Rolla
Assistant Examiner—Robert J. Oberleitner
Attorney, Agent, or Firm—Stevens, Davis, Miller & Mosher

[57] ABSTRACT

A vehicle brake system for an arrangement having a prime mover and at least one tandem trailer. The system includes a respective sub-system for the prime mover and each tandem trailer and each sub-system has a plurality of spring brakes which are held out of a park mode by pressurized air in a hold-back chamber and are caused to operate in a normal manner by pressurized air supplied to a service chamber. Each sub-system includes a service relay valve which is operable to connect pressurized air with the service chambers of the respective spring brakes and the prime mover sub-system includes a control relay valve which is operable to cause operation of the service relay valves of that sub-system and the adjacent tandem trailer sub-system. If there are two or more tandem trailers, each tandem trailer sub-system apart from the last includes a control relay valve and each succeeding control relay valve is operated as a consequence of operation of the control relay valve of the respective preceding sub-system.

7 Claims, 8 Drawing Figures

VEHICLE BRAKE SYSTEM AND VALVE

This invention relates to vehicle brake systems and is particularly concerned with pneumatically operated brake systems for vehicles having a prime mover and at least two trailer sections coupled to that prime mover. It will be convenient to hereinafter describe the invention with particular reference to a road vehicle having a primary trailer connected to the prime mover and a second or following trailer connected in tandem to the primary trailer. The vehicle may include additional trailers connected in tandem one behind the other, but the following description will deal mainly with a single trailer-tandem arrangement.

Pneumatically controlled spring brakes are being used with advantage on trailer vehicles, but the use of such brakes increases the complexity of the total braking system particularly when the vehicle includes one or more tandem trailers. Prior to the present invention it has not been convenient to adapt conventional pneumatic brake systems for use with spring brakes so that conversion from one system to another is difficult. Furthermore, the spring brake systems used to date have not been entirely satisfactory in their speed of response, particularly in relation to the brakes of the tandem trailer.

It is an object of the present invention to provide a relatively simple and effective braking system for multiple axle vehicles which include spring brakes. It is another object of the invention to provide an improved valve for use in such a system.

According to one aspect of the present invention, there is provided a vehicle brake system including, a prime mover sub-system, at least one tandem trailer sub-system, a source of pressurized air, and control means for said sub-systems, each said sub-system having a plurality of pneumatically operated brakes, and said control means is operative to connect said source to the brakes of the tandem sub-system and as a consequence causes said source to be connected to the brakes of the prime mover sub-system, whereby the brakes of each said sub-system are caused to operate.

According to a further aspect of the present invention, there is provided a vehicle brake system including, a prime mover sub-system, at least one tandem trailer sub-system, a source of pressurized air, each said sub-system having a plurality of spring brakes, a distribution valve and a relay valve, each said spring brake having a spring actuator, a hold-back chamber and service chamber, each said distribution valve connecting said source to the hold-back chamber of each said spring brake in its respective said sub-system so as to thereby render the spring actuator of each said spring brake inoperative, each said relay valve being operable to connect said source to the service chamber of each said spring brake in its respective said sub-system so as to thereby operate each said spring brake, and a control valve connected to both said relay valves and being operable to cause operation of said relay valves.

The essential features of the invention, and further optional features, are described in detail in the following passages of the specification which refer to the accompanying drawings. The drawings however, are merely illustrative of how the invention might be put into effect, so that the specific form and arrangement of the features (whether they be essential or optional features) shown is not to be understood as limiting on the invention.

A brake system according to the present invention is characterized in that the initial response to operation of the brake control is that the service reservoir is connected to the brakes of the tandem trailer. The system then responds to that connection to connect the service reservoir to all other brakes of the system. That is, the connection with the prime mover and primary trailer brakes is effected as a consequence of the connection made with the tandem trailer brakes. It will be convenient to hereinafter describe that concept with reference to one particular brake system as applied to a road vehicle in which the primary trailer is a semi-trailer so that the prime mover and semi-trailer combination has three axles.

Figure 4:
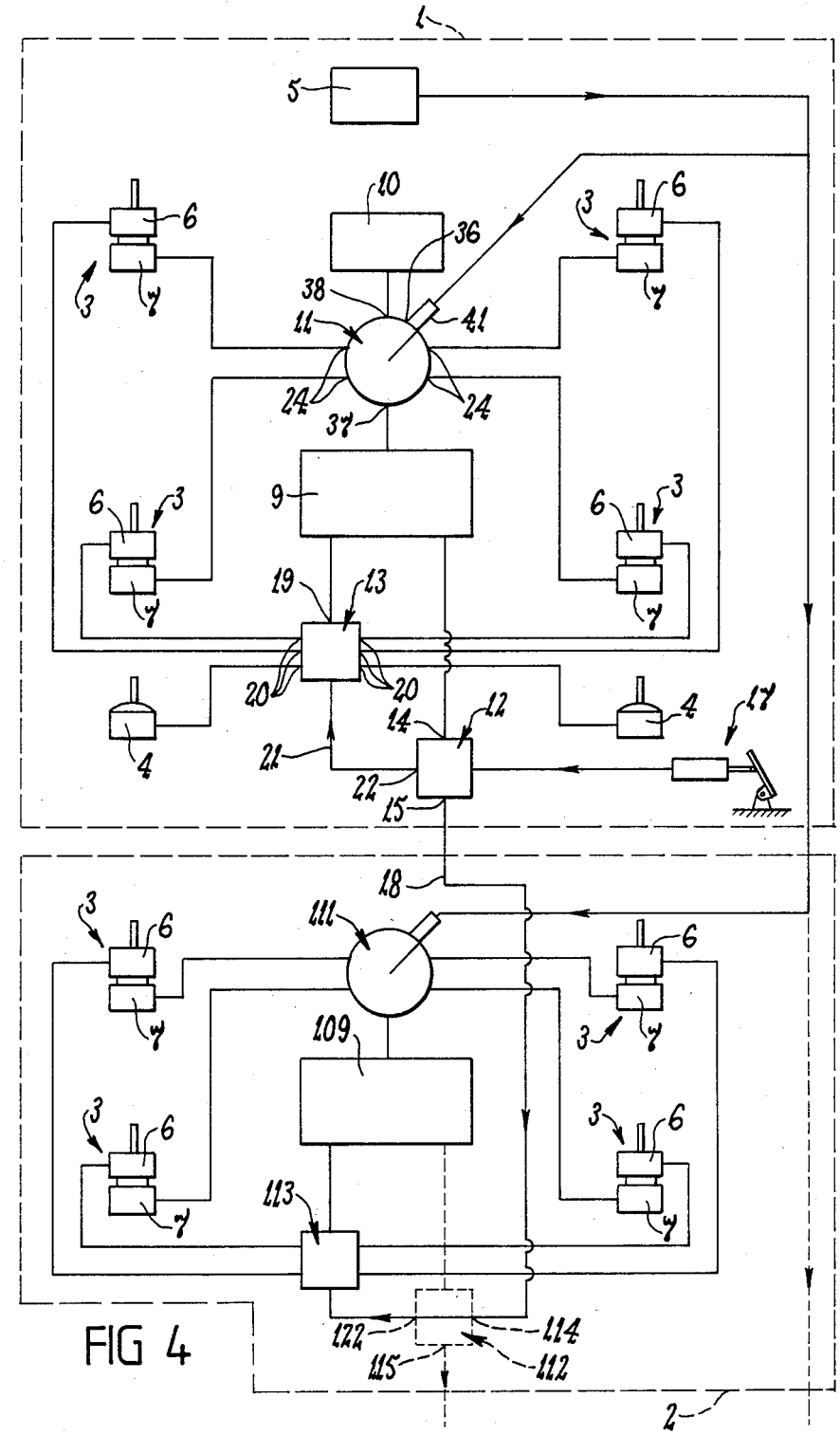
FIG. 4 is a diagrammatic representation of an example vehicle brake system according to the present invention.

FIG. 4 represents a typical brake system as applied to a vehicle of the foregoing kind. In that figure the block 1 is representative of the prime mover and primary trailer combination and the block 2 is representative of the tandem trailer. In that typical system spring brakes 3 are used on the front and rear axles of the prime mover and pneumatic brakes 4 are used on the trailer axle of the combination 1. The tandem trailer 2 may use spring brakes 3 on each axle if a two axle trailer is used, and if the trailer has three axles pneumatic brakes may be used on the third axle. Pressurized air for all brakes is provided by the supply system 5 of the prime mover which is of well known form and operation and will be hereinafter simply referred to as the supply.

Figure 1:
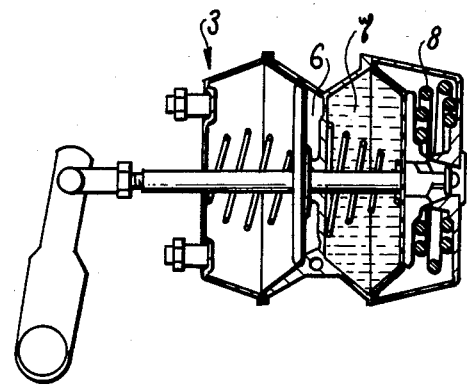
FIG. 1 is a diagrammatic cross sectional view of a typical spring brake in the normal driving condition.
Figure 2:
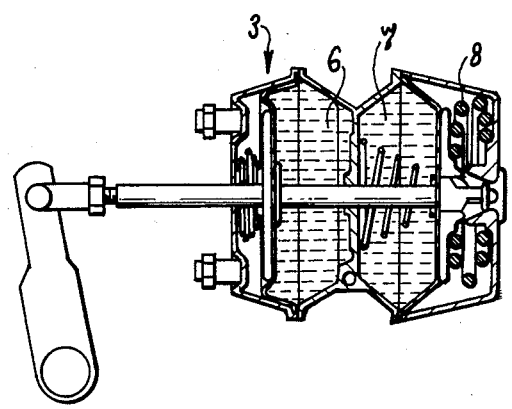
FIG. 2, is a view similar to FIG. 1, but showing the condition of the spring brake during normal service operation.
Figure 3:
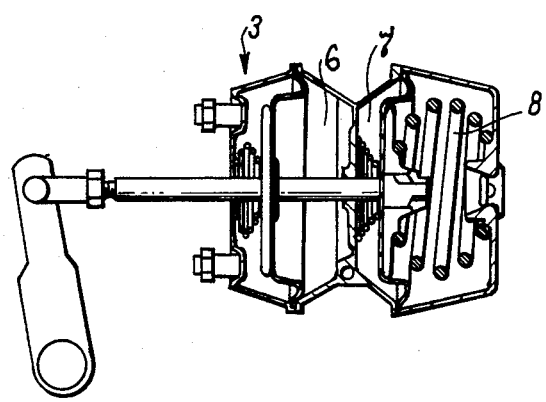
FIG. 3 is a view similar to FIG. 1 but showing the condition of the spring brake in the vehicle park mode.

It is a characteristic of spring brakes 3 that they have two modes of operation which may be termed normal and parking modes respectively. In the normal mode as shown by FIG. 1, the brake 3 is caused to operate by air pressure as in a conventional pneumatic brake 4, whereas in the parking mode as shown by FIG. 3, the brake 3 is caused to operate by mechanical spring pressure. Such brakes 3 include two chambers 6 and 7 which, for convenience, will be called the service and hold-back chambers respectively. The mechanical spring actuator 8 which applies the brake 3 under the parking mode is held in a compressed and therefore inoperative state by pressurized air supplied to the hold-back chamber 7 as shown in FIG. 1. Supply of pressurized air to the service chamber 6 results in normal operation of the brake 3 and in that mode of operation both chambers 6 and 7 will be pressurized as shown in FIG. 2.

A brake system for a tandem trailer vehicle will include a plurality of sub-systems, the number of which varies with the number of tandem trailers. In the situation illustrated by FIG. 4 the primary trailer is a semi-trailer, so there may be one sub-system for the prime mover and semi-trailer combination 1 and another sub-system for each tandem trailer 2. The first mentioned sub-system will involve three axles as previously mentioned and each of the other sub-systems may involve two or three axles according to the nature of the particular tandem trailer. The general arrangement of each sub-system remains substantially the same even though the number of axles may vary.

In the FIG. 4 arrangement, the sub-system of the prime mover and semi-trailer combination 1 includes a service reservoir 9 and a secondary reservoir 10, each of which is connected to the supply 5 through a distribution valve 11 as hereinafter described. That distribution valve 11 is also connected to the hold-back chamber 7 of each spring brake 3 and under normal operating conditions provides a continuing connection between each of those chambers 7 and the supply 5. The distribution valve 11 is also operable to exhaust each hold-back chamber 7 to atmosphere so that the spring brakes 3 can operate in the parking mode as shown by FIG. 3.

A pair of relay valves 12 and 13 are also connected to the service reservoir 9 and it will be convenient to refer to those valves as the control and service relay valves respectively. Such relay valves are of known construction and operation and consequently will not be described in great detail. The control relay valve 12 has an inlet port 14 connected to the service reservoir 9 and an outlet port 15 connected to the next sub-system. The operating chamber 16 (see FIGS. 5 and 6) of the control relay valve 12 is connected to the control system 17 of the vehicle so that pressurized air is introduced into that chamber 16 in response to the control system 17 being operated to cause actuation of the brakes 3 and 4. Pressurization of the operating chamber 16 causes the valve 12 to provide connection between its inlet port 14 and outlet port 15 so that air from the service reservoir 9 enters the line 18 to the next sub-system. Depressurization of the operating chamber 16 on the other hand, closes that connection.

Figure 5:
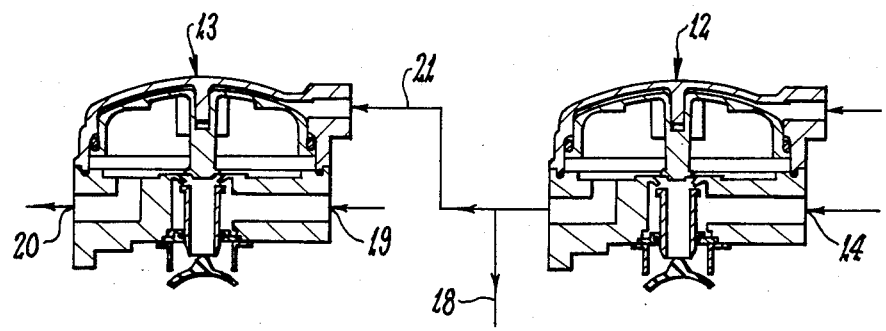
FIG. 5 is a diagrammatic cross sectional view of control and relay valves of the system according to FIG. 4.
Figure 6:
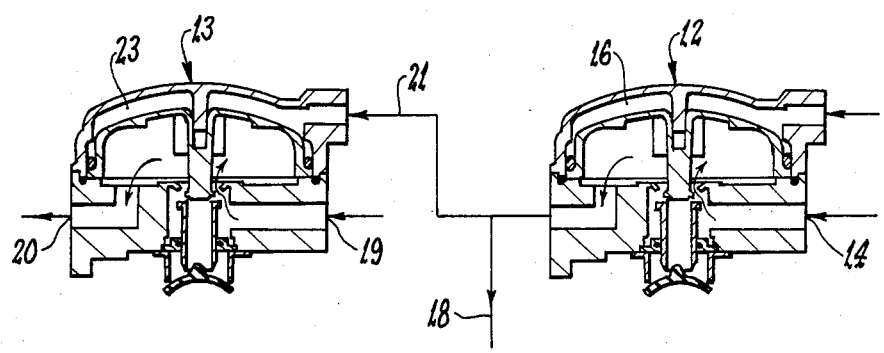
FIG. 6 is a view similar to FIG. 5 but showing the valves in a different condition of operation.

The service relay valve 13 has an inlet port 19 also connected to the service reservoir 9 and has a plurality of outlet ports 20, each of which is connected to a respective brake 3 or 4. By way of convenience, FIGS. 5 and 6 show only one outlet port 20 of the valve 13. In the case of a spring brake 3, the respective outlet port 20 is connected to the service chamber 6 of that brake 3. A connection 21 is provided between a further outlet port 22 of the control relay valve 12 and an operating chamber 23 of the service relay valve 13. Again as a matter of convenience that further port 22 is not shown in FIGS. 5 and 6. Alternative to providing such a further port 22, the chamber 23 may be connected to the line 18 from the control relay valve 12 to the next sub-system. When the operating chamber 23 is pressurized by air received from the line 18 or the outlet 22, the valve 13 operates to connect each outlet port 20 to a service chamber 6 and thereby causes operation of each connected brake 3 and 4.

Operation of the aforementioned sub-system is as follows. Pressurized air from the supply 5 is connected to the distribution valve 11 and is fed to the service reservoir 9 through that valve 11. The supply air also serves to operate the valve 11 so that it connects each of the outlet ports 24 of that valve 11 to the hold-back chambers 7 and as a result the spring brakes 3 are restrained from operating in the parking mode. Operation of the distribution valve 11 will be hereinafter described in greater detail.

When it is desired to operate the brakes 3 (normal mode for the spring brakes), the vehicle operator actuates the control system 17 in an appropriate manner so that pressurized air is fed to the operating chamber 16 of the control relay valve 12. That valve 12 then functions to connect the service reservoir 9 to the next sub-system which, in the arrangement shown, is incorporated in the tandem trailer 2, and in so doing automatically causes pressurized air to be fed to the operating chamber 23 of the service relay valve 13.

The outlet port 15 of the control relay valve 12 is connected to the operating chamber of a relay valve of the next sub-system - i.e., the sub-system associated with the tandem trailer 2. That connection then serves as a control connection for the tandem trailer brakes 3 so that they are brought into operation in the same manner as the brakes 3 and 4 of the prime mover and semi-trailer combination 1. In fact, the tandem trailer brakes 3 may be actuated marginally before the brakes 3 and 4 of the prime mover and sami-trailer combination 1.

It will be apparent from the foregoing that operation of the first sub-system control relay valve 12 automatically results in operation of the service control valve 13 of the same sub-system. That has the consequence of applying pressurized air to each of the brakes 3 and 4 of the sub-system so that they are actuated in the normal manner.

A significant advantage of the system described is that a conventional brake system can be easily adapted to be usable with spring brakes in a tandem trailer arrangement. It is only necessary to add the valve 12 and connecting conduit to such a conventional system. Another advantage is the speed with which the tandem trailer brakes are applied.

In the particular arrangement shown by FIG. 4 the sub-system of the tandem trailer 2 is substantially the same as that of the prime mover combination 1 except that it omits a secondary reservoir and a control valve. That is, the distribution valve 111 of that sub-system is connected to a service reservoir 109 only and the output of valve 12 is passed along the line 18 to the operating chamber of a service relay valve 113. The valves 111 and 113 operate in the same manner as the corresponding valves 11 and 13 of the sub-system of the primary mover combination but in respect of their control of the brakes 3 to which they are connected.

If the arrangement is to include a further tandem trailer the sub-system of the tandem trailer 2 may include a control relay valve 112 as shown in broken line in FIG. 4. The valve 112 operates in the same manner as the valve 12 and has its outlet port 115 connected to the operating chamber of a relay valve of the second tandem trailer (not shown). The inlet port 114 of the valve 112 is connected to the outlet port 15 of the valve 12, and the outlet port 122 is connected to the service relay valve 113.

In an arrangement having a plurality of of tandem trailers the sub-system of the final tandem trailer need not have a valve corresponding to the control relay valve 12. Such a sub-system may be substantially as first described in relation to the tandem trailer 2, although a secondary reservoir 10 is not usually required.

Figure 7:
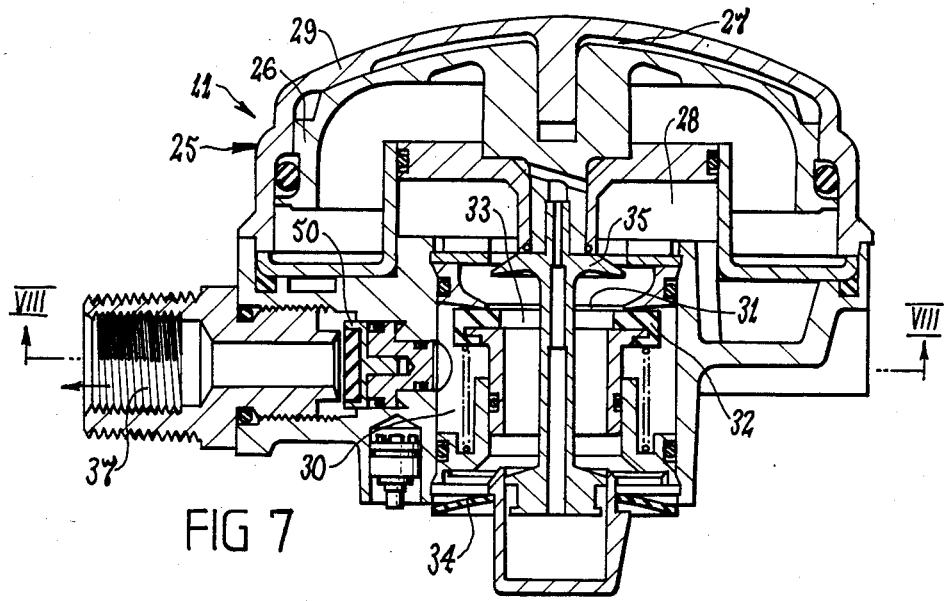
FIG. 7 is a cross sectional view of one form of distribution valve as used in the system of FIG. 4.
Figure 8:
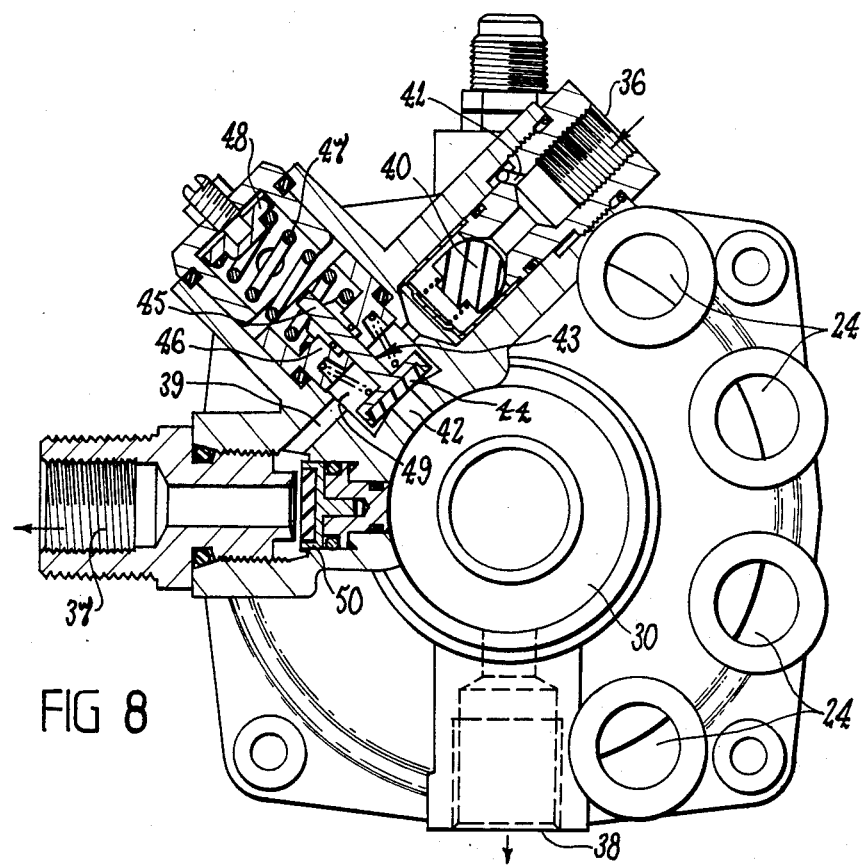
FIG. 8 is a cross sectional view taken along line VIII—VIII of FIG. 7.

The distribution valve 11 as shown in FIGS. 7 and 8 includes a hollow body 25 having a piston 26 slidable therein and that piston 26 divides the interior of the body 25 into an operating chamber 27 and a distribution chamber 28. The operating chamber 27 is between the piston 26 and an end wall 29 of the valve body 25 and is connected to the supply 5 as hereinafter described. Each of the outlet ports 24 is in open communication with the distribution chamber 28 and in the system previously described each outlet port 24 is connected to the hold-back chamber 7 of a respective spring brake 3. There will be four outlet ports 24 in that particular application.

A third chamber 30 is provided within the valve body and that will be referred to as the supply chamber. The supply chamber 30 is able to receive pressurized air from both the service and secondary reservoirs 9 and 10 and is connectable with the distribution chamber 28 through a primary orifice 31 of the valve 11. When the valve 11 is not operational, the orifice 31 is closed by a primary closure member 32 which is mounted within the body for movement towards and away from the orifice 31 and which may be spring influenced in the former direction. The distribution chamber 28 is also connectable with atmosphere through an exhaust orifice 33 which may be formed through the primary closure member 32 and communicates with a diaphragm valve 34 or other one-way valve which opens in response to pressure on the outlet side of the exhaust orifice 33 and thereby allows that pressure to be exhausted to atmosphere.

The exhaust orifice 33 is closable by a secondary closure member 35 which is preferably carried by the piston 26 for movement therewith. The arrangement shown in FIGS. 7 and 8 is such that the secondary closure member 35 operates to close the exhaust orifice 33 after the piston 26 has moved a predetermined distance away from the adjacent end wall 29 of the valve body 25. That is the exhaust orifice 33 is closed as a consequence of expansion of the volumetric size of the operating chamber 27. It is further preferred that the secondary closure member 35 bears against the primary closure member 31 when in the exhaust orifice closed position so that further movement of the piston 26 away from the end wall 29 of the valve body 25 causes the primary closure member 31 to be moved against its spring bias to open the primary orifice 31. Thus, opening of the primary orifice 31 follows and is consequential to closing of the exhaust orifice 33.

In the preferred form of the distribution valve 11 as shown, it has an inlet port 36 and two reservoir ports 37 and 38. When connected into a system as described the reservoir port 37 is connected to the service reservoir 9, the other reservoir port 38 is connected to the secondary reservoir 10, and the inlet port 36 is connected to the vehicle air supply 5 as previously referred to.

The supply port 36 communicates with the service reservoir port 37 through a supply passage 39 extending through a wall of the valve body 25. A spring influenced poppet valve 40 or other one-way valve is provided between the supply port 36 and the supply passage 39 so as to prevent outward flow from the passage 39 into the port 36. The supply 5 is also connectable to the operating chamber 27 of the valve 11 and that may be effected through a transfer passage 41 formed in the valve body and connecting the supply port 36 to the operating chamber 27. As shown, the transfer passage 41 is preferably on the port side of the poppet valve 40.

Communication between the service reservoir 9 and the supply chamber 30 of the valve 11 is effected through a supply orifice 42 provided between that chamber 30 and the supply passage 39. The supply orifice 42 is preferably controlled by a pressure responsive valve 43 in a manner such that the orifice 42 remains closed until pressure within the supply passage 39 reaches a predetermined level. In the example shown, the valve 43 includes a head portion 44 which is operable to close the suply orifice 42, a stem 45 projecting from that head portion 44, and a piston portion 46 connected to the stem 45 in spaced relation to the head portion 44. A spring 47 serves to hold the valve 43 in its closed position and means 48 may be provided to enable adjustment of the spring pressure to suit particular requirements. The supply passage 39 communicates with the space 49 between the head and piston portions 44 and 46 and the respective areas of those portions is preferably such that fluid pressure within the supply passage 39 will exert an opening influence on the valve 43.

It is also preferred that a one-way valve 50 is associated with the service reservoir port 37 so as to close that port 37 under certain pressure conditions. The valve 50 may be pressure responsive and arranged to respond to differences in pressure between the service reservoir port 37 and the supply chamber 30.

The secondary reservoir port 38 on the other hand may be in open communication with the supply chamber 30 at all times.

When a distribution valve 11 as described is connected into a brake system as described, operation of that valve will be as follows. Pressurized air from the supply 5 enters the supply port 36 and from there passes through the transfer passage 41 into the operating chamber 27. Assuming that air is at a sufficient pressure it will also open the poppet valve 40 so as to enter the supply passage 39 and pass from there into the service reservoir 9. At that time, the supply orifice 42 is closed and the one-way valve 50 for the service reservoir port 37 is held open by the pressurized air in the supply passage 39. Entry of the pressurized air into the operating chamber 27 causes the valve piston 26 to move to expand that chamber 27 so that a stage is reached at which the exhaust orifice 33 is closed and the hold-back chambers 7 of the connected spring brakes 3 are thereby prevented from exhausting to atmosphere. As the piston 26 continues to move, the primary orifice 31 is opened providing communication between the supply and distribution chambers 30 and 38. That automatically results in connection between the secondary reservoir 10 and the hold-back chambers 7 of the spring brakes 3, but there will be substantially simultaneous connection between those brake chambers 7 and the service reservoir 9 since at that time the pressure within the supply passage 39 will usually be sufficiently high to open the supply orifice 42.

Pressurized air from the two reservoirs 9 and 10 is thereby fed to the brake hold-back chambers 7 so that the spring brakes 3 are held out of the parking mode (FIG. 3). That condition remains for so long as an adequate supply of pressurized air is provided to the operating chamber 27 of the distribution valve 11. In that regard, it is preferred that the surface of the valve piston 26 exposed to the operating chamber 27 is of larger area than the piston surface exposed to the distribution chamber 28, so that a larger force acts against the operating chamber side of the piston 26. By way of example, the difference in areas may be in the region of three to one.

When the vehicle engine is stopped, pressurized air will of course cease to flow to the distribution valve 11 and there will be a consequent drop in pressure within the operating chamber 27 of that valve 11. The same drop will not occur within the distribution and supply chambers 28 and 30 of the valve because of the operation of the poppet valve 40. A condition will then be reached at which the pressure difference between the distribution and operating chambers 28 and 27 is such that the valve piston 26 is moved back towards the adjacent end wall 29 of the valve body 25 with the result that the primary and exhaust orifices 31 and 33 will close and open respectively. As the exhaust orifice 33 opens pressurized air escapes from the distribution chamber 28 and consequently from the hold-back chambers 7 of the spring brakes 3, to impinge against and open the diaphragm valve 34. In that way, the hold-back chambers 7 are bled to atmosphere and the spring brakes 3 adopt their parking mode (FIG. 3).

A valve 11 as described has several advantages, particularly when used in a spring brake system as also described. One advantage is the ability to enable the spring brakes 3 to be held out of the parking mode in the event of failure of the service reservoir 9. If such failure does occur, the supply orifice 42 will be closed by its associated pressure responsive valve 43 and the one-way valve 50 will close the service reservoir port 37. As a result, pressure will be retained within the secondary reservoir 10 and will be connected to the spring brake hold-backchambers 7 while the primary orifice 31 of the distribution valve 11 remains open.

In the event of failure of the supply, the distribution valve 11 will operate to exhaust the hold-back chambers 7 and thereby cause the spring brakes 3 to adopt the parking mode. Pressurized air will nevertheless be maintained within the service and secondary reservoirs 9 and 10 through the operation of the poppet valve 40 and other pressure responsive valves forming part of the total assembly. A similar result arises if any one of the lines to the spring brakes 3 fails.

It will be apparent from the foregoing description that both the system and the valve provide substantial advantages. Although the system and valve have optimum advantage when used together, they are nevertheless usable separate from one another.

Various alterations, modifications and/or additions may be introduced into the constructions and arrangements of parts previously described without departing from the spirit or ambit of the invention as defined by the appended claims.

The claims defining the invention are as follows. I claim:

1. A vehicle brake system comprising, a prime mover sub-system, at least one tandem trailer sub-system, a source of pressurized fluid, each said sub-system having a plurality of spring brakes, a distribution valve and a relay valve, each said spring brake having a spring actuator, a hold-back chamber and service chamber, each said distribution valve connecting said source to the hold-back chamber of each said spring brake in its respective said sub-system so as to thereby render the spring actuator of each said spring brake inoperative, each said relay valve being operable to connect said source to the service chamber of each said spring brake in its respective said sub-system so as to thereby operate each said spring brake, a control valve connected to both said relay valves and being operable to cause operation of each said relay valve and a control system which is operative to apply pressurized fluid to said control valve and thereby cause operation of that valve so that it exposes each said relay valve to pressurized fluid and thereby causes operation of said relay valves, whereby the brakes of each said sub-system are operated as a consequence of operation of said control valve.

2. A system according to claim 1, wherein said prime mover sub-system includes a service reservoir and a secondary reservoir, and the distribution valve of said prime mover sub-system connects said source to said reservoirs and connects said reservoirs to said hold-back chambers.

3. A system according to claim 2, wherein said distribution valve includes a supply passage through which fluid from said source is connected to said reservoirs, and a poppet valve which closes communication between said supply passage and said source if the pressure from said source falls below the pressure within said supply passage.

4. A system according to claim 2, wherein said distribution valve has a plurality of outlets, each of which is connected to a respective said hold-back chamber, a supply chamber connected to said supply passage and to said outlets, and a pressure responsive one-way valve through which said supply chamber is connected to said service reservoir, said one-way valve being operative to close in response to loss of pressure within said service reservoir.

5. A system according to claim 1, wherein said control valve is operated by fluid pressure from a source independant of said pressurized fluid source.

6. A system according to claim 1, wherein said control valve has an inlet connected to said source and two outlets each of which is connected to an operating chamber of a respective said relay valve, and operation of said control valve causes pressurized fluid to pass from said inlet to said outlets.

7. A system according to claim 6, wherein each said relay valve has an inlet, a plurality of outlets, and closure means operable to control transfer of pressurized air between said inlet and said outlets, each said relay valve inlet is connected to said source, each said relay valve outlet is connected to a respective said spring brake, and said closure means is responsive to pressure within the operating chamber of the respective valve so as to allow said transfer of pressurized fluid.

* * * * *